March 24, 1959

T. A. INSOLIO 2,878,622

GLASS BREAK-OFF MACHINE

Filed June 29, 1955

INVENTOR.
Thomas A. Insolio
BY
Webb, Mackey & Burden
HIS ATTORNEYS

March 24, 1959 T. A. INSOLIO 2,878,622
GLASS BREAK-OFF MACHINE
Filed June 29, 1955 5 Sheets-Sheet 3

INVENTOR.
Thomas A. Insolio
BY Webb, Mackey & Burden
HIS ATTORNEYS

March 24, 1959  T. A. INSOLIO  2,878,622
GLASS BREAK-OFF MACHINE
Filed June 29, 1955  5 Sheets-Sheet 4

INVENTOR.
Thomas A. Insolio
BY Webb, Mackey & Burden
HIS ATTORNEYS

United States Patent Office 2,878,622
Patented Mar. 24, 1959

2,878,622

GLASS BREAK-OFF MACHINE

Thomas A. Insolio, Jeannette, Pa., assignor to American Window Glass Company, Pittsburgh, Pa., a corporation of Pennsylvania Application June 29, 1955, Serial No. 518,731

22 Claims. (Cl. 49—48)

The present invention relates to a glass break-off machine for operation, preferably automatically, upon scored rectangular pieces or sections of glass to be removed from a vertically moving parent sheet of glass. This break-off machine finds general application for use in conjunction with sheet glass issuing forth from drawing or annealing apparatus and is particularly suitable for use with Fourcault apparatus in case it is equipped with a Klages-type scoring or capping device as described in Klages U. S. Patent No. 2,650,430. In this latter case, the Klages device automatically scores a section of the parent sheet of glass, whereupon the present break-off machine is adapted automatically to break off and remove the scored section from the parent sheet.

In the past in the arrangement of scoring and break-off apparatus for vertically rising sheet glass, it has been customary, in some instances, to stop the ascent of the glass temporarily during scoring and/or break-off to insure an exactly transverse score and break line thereby producing a purely rectangular shape to the piece being broken off, that shape being the preferred one for further processing. It involves an exact and well-coordinated operation to follow the glass upwardly with a portion of thte apparatus and then score and cleanly break-off a rectangular piece of the same by means of another portion of that same apparatus, all without interrupting the upward travel of the glass. By means of the present machine, the scored piece of continually moving glass is followed upwardly and subjected to a clean break-off action through motion of combined rotation and retraction which snaps the glass about a centrode or center moving upwardly with, but laterally outwardly from, the score line. The resulting parting line at break-off is clean at the outset and the subsequent motion of the parted piece of glass is rapid and in a direction directly away from any position of possible interference with the newly fractured edges of the remaining glass from which it was parted.

Further features, objects, and advantages of the present invention will either be specifically pointed out or become apparent, when, for a better understanding of the invention, reference is made to the following description taken in conjunction with the accompanying drawings in which, in general:

Figures 1, 3:
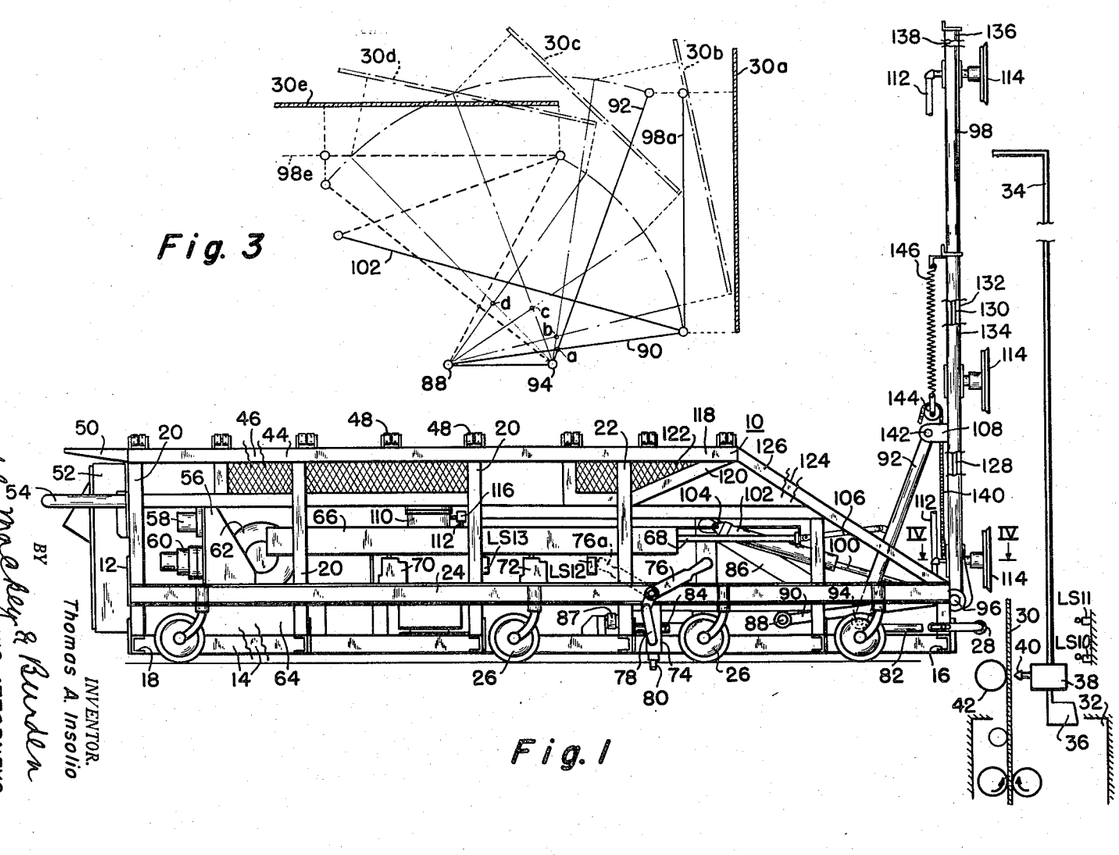
Figure 1 is a side elevational view of the present glass break-off machine.
Figure 3 is a diagrammatic motion study of the arm and frame assembly carried by the carriage of Figure 2.

In particular, in Figure 1 a portable glass break-off machine 10 is shown having a bed 12 comprising at the base thereof a pair of longitudinally extending, parallel side rails 14 connected at the front and rear respectively to one another by means of a front cross rail 16 and a rear cross rail 18 of general channel cross section. Each of the side rails 14 supports a series of three vertically upstanding side stakes 20 toward the rear and a front upstanding side stake 22. Intermediate their opposite ends, each series of the side stakes 20, 22 carries a longitudinally extending suspension rail 24 which mounts a plurality of casters 26. The casters 26 are arranged four to a side of the machine and render the machine portable for movement along a horizontal supporting surface which may be a reinforced concrete floor. At its forward end, the bed 12 adjustably supports a glass engaging fulcrum roller 28 adapted to engage and form a bend fulcrum for a section 30 of glass to be broken from but carried by an upwardly moving ribbon of glass issuing from a glass drawing machine 32 adjacent, but below, the forward portion of the machine 10. The section 30 of glass is adapted to engage at its upwardly rising end a paddle structure 34 which carries at the bottom end thereof a switch engaging cam 36 and a carriage supported cutter's cage 38. The cam 36 is adapted to operate in sequence a series of stationary limit switches LS10, LS11 hereinafter more fully described in detail. The carriage supported cutter's cage 38 carries a scoring tool 40 of the proper kind and the glass 30 is held up against the pressure of the scoring tool as by means of a back-up roller 42. The carriage supported cutter's cage 38 forms no per se part of the present invention and is more completely disclosed and described in the aforementioned Klages Patent No. 2,650,430.

The bed 12 carries a rectangularly shaped upper framework at the top of and between the side stakes 20, 22 and including a pair of laterally spaced apart, longitudinally extending table rails 44, 46. The table rails 44, 46 carry a plurality of upstanding casters 48 for use in the side delivery and withdrawal of a sheet of glass when supported thereon above the table rail. At the rear of the upper framework the table rails 44, 46 support a cantilever shelf portion 50 which protects and partially conceals a control cabinet 52 for the use by an operator in controlling the present machine 10. An operator's handle 54 surrounds the cabinet 52 and is secured at its forward ends by means of bolts to the opposite rear side stakes 20. The bed 12 contains a pedestal 56 which is carried by the suspension rails 24 and which supports a plurality of pressure gauges 58 visible to the operator and also a source of electric power 60, which may be a transformer, connected by means of an appropriate cable to a wall outlet plug in the vicinity of the machine 10. Power from the electric source 60 is used to supply an electrically driven pump and hydraulic unit 62 which circulates oil under pressure from an oil reservoir and cooling tank 64 mounted on the side rails 14 of the bed 12. The side stakes 20 and 22 carry an encased camshaft device 66 which slidably mounts therein a forwardly extending, longitudinally disposed camshaft 68. A plurality of limit switches LS12, LS13 is stationarily mounted to the bed 12 in cooperative adjacency to the encased camshaft device 66 and a plurality of restrictive valves 70, 72 for the hydraulic system is similarly mounted.

Each of the side rails 24 in the bed 12 carries a depending encased anchoring device 74 including a pair of toggle links 76, 78 which are swingably carried thereby to operate a vertically reciprocable anchoring pin 80 adapted to be received in an appropriate aperture formed in the supporting surface for the casters 26. One of the toggle links 76 forms a handle which is swingable by the operator from the dotted line inactive position 76a of Figure 1 into the solid line anchored position to advance the anchoring pin 80 from retracted to advanced position. By means of a pair of longitudinally spaced apart slide bearings hidden in Figure 1, the bed 12 slidably supports a pair of interconnected slide rods 82, 84, one pair of which is carried at one side of a slidable carriage 86 and another pair of which is carried at the opposite side of the slidable carriage 86. A double acting hydraulic carriage motor 87 which is pivotally anchored at one end and is pivoted to the carriage 86 at the other end, is supplied with hydraulic fluid from the pump unit 62 to advance and retract the carriage under power. A pivot 88 at each of the sides of the carriage 86 swingably mounts the lower end of a pair of laterally spaced apart parallel controlling arms 90, forming part of a double-pivoted arm assembly which includes another pair of parallel break-off arms 92 which are pivotally supported at their lower ends to the slidable carriage 86 by means of a pair of spaced apart pivots 94. The outer or free ends of the controlling arms 90 have what I term a knuckle joint connection which pivots then at laterally spaced apart points to a transverse horizontally extending member 96 forming the base of a supported frame forming a gripper or vacuum cup framework 98. The transversely disposed frame member 96 is pivotally connected to the piston rod 100 of each one of a pair of reversible hydraulic piston and cylinder motors 102 for controlling the arm assembly. Each of the arm controlling motors 102 is pivotally connected at 104 to the shiftable carriage 86.

Intermediate its opposite ends, one of the break-off arms 92 of the arm assembly is connected by means of a pivoted link 106 to the longitudinally slidable camshaft 68 which controls the limit switches LS12, LS13 and the restrictive valves 70, 72 for the hydraulic system. At their upper free ends, the break-off arms 92 are pivotally connected to a bracket 108 which is rigid with the vacuum cup framework 98. An electrically driven vacuum pump 110 supplied from the cable-connected source of electric power is connected by means of appropriate vacuum conduit 112 to two series of three vertically disposed vacuum cups 114 arranged three to a side of the vacuum cup framework 98. A control valve 116 which may be solenoid controlled in an automatic fashion hereinafter more fully described is interposed in the vacuum conduit 112 for alternately connecting the cups 114 to atmosphere or to vacuum produced by the vacuum pump 110. The framework 98 supported by the swinging arm assembly has a limiting horizontal position below the level of the table side rails 44, 46 of the bed 12 and has a limiting vertical position shown in solid lines in Figure 1 in each of which the supporting arms 90, 92 are engageable with appropriate stops. The forward ones of these stops may be carried by the front outrigger structure associated with the front ends of the side rails 24 described as follows:

The table side rails 44, 46 have a cantilevered forward extension portion 118 which is suitably braced therebelow at 120 and covered at the sides with part of a section of expanded metal 122 providing generally for ventilation within the bed 12. A pair of forwardly and downwardly extending diagonal braces 124, 126 connect the cantilever portion 118 to the front ends of the side rails 24. Each set of three vacuum cups 114 is connected together as a unit by means of interposed, vertically extending rods 128, 130 between the cups so as to form a slide effective to travel longitudinally of a pair of closely spaced, parallel pipes 132, 134 in the framework 98. The pipes just referred to, in conjunction with a similar pair 136, 138 form a frame of longitudinally extending pipes 132, 134, 136, 138, whereon between the pipes 136, 138 the other set of vacuum cups 114 and cup connected rods are located to form a slide supported for endwise movement similar to the slide referred to on the pipes 132, 134.

The presence of these slides enables the two sets of cups 114, which are connected thereto, to slide in coordination longitudinally in their respective operative positions on the opposite sides of the framework 98. The lowermost vacuum cup 114 on each side of the frame 98 is counterbalance connected by means of a flexible chain 140 to a chain anchoring point 142 carried by the bracket 108. The chain 140 is trained over a vertically upwardly acting pulley 144 which is spring biased by means of a spring 146 in a direction to tend to neutralize the weight of the assembly of the rods 128, 130 and the vacuum cups 114 which as noted is slidably mounted for longitudinal movement with respect to the pairs of pipes 132, 134 and 136, 138.

In operation of the machine of Figure 1, the carriage supported cutter's cage 38 is appropriately shifted in its supporting carriage to transversely score the section of glass 30 at a point adjacent the base thereof at which it is to be broken off in the general locality of the backing roller 42. More particularly, it is desirable that the break-off occur when the scored line is approximately at the level of or slightly above the knuckle joint formed at 96 between the controlling arms 90 and the vacuum cup framework 98. With the arm assembly and the framework 98 in the vertical position shown in solid lines in Figure 1, the supporting carriage 86 is automatically caused to shift forwardly along the bearing supported rods 82 and 84 and the vertically disposed vacuum cup framework 98, is moved into a position of adjacency to the glass 30, whereupon the vacuum cups 114, under suction by means of the vacuum pump 110, engage and grip the glass 30. By appropriate rotational and retractive movement of the vacuum cup framework 98, hereinafter more fully described, the arm assembly 90, 92 causes the framework to retract and break off and remove the glass plate 30 from the parent ribbon of glass from which it is parted. Thereupon the framework 98 assumes a horizontal position below the level of the casters 48 in the table framework of the bed 12 and the weight of the glass is transferred to the casters 48. Simultaneously the vacuum of the cups 114 is released. Thereupon the operator slides the glass from the machine 10 along the casters 48. For a fuller understanding of the carriage 86 and the operation of the arm assembly 90, 92, reference may be had to Figure 2.

Figure 2:
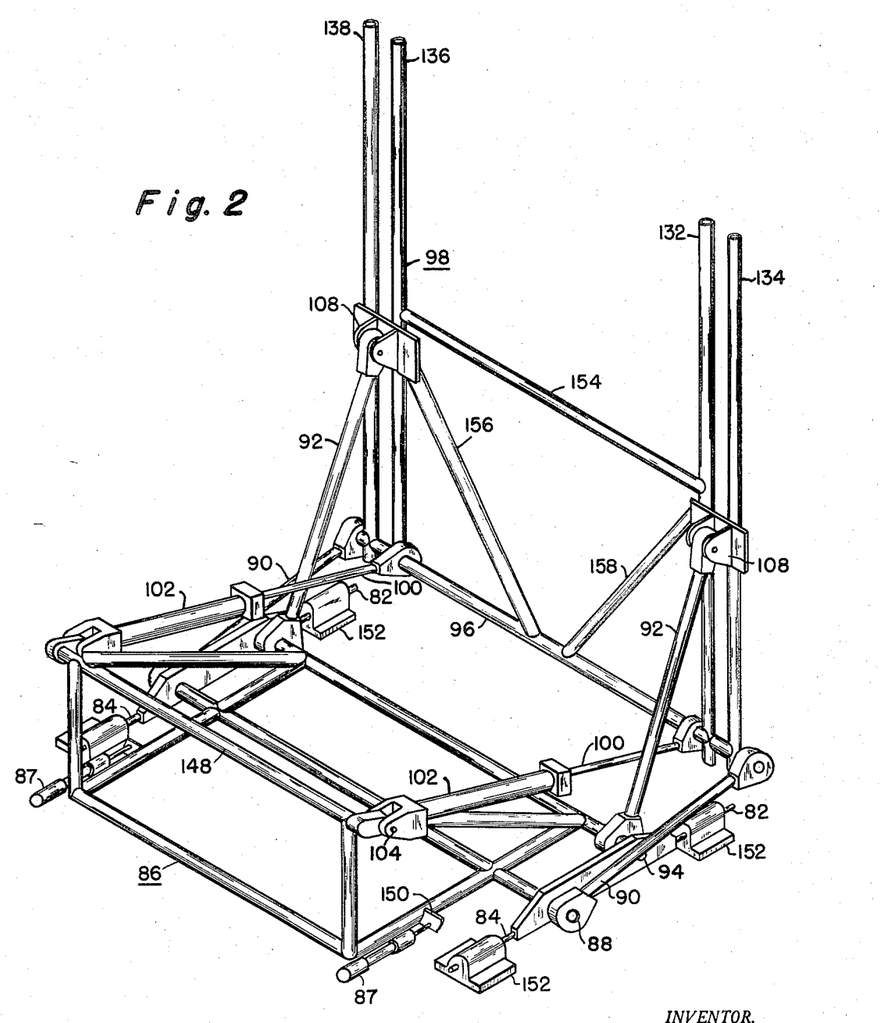
Figure 2 is a diagrammatic perspective view of a shiftable carriage on the machine of Figure 1.

In Figure 2, the carriage 86 includes an upstanding rear frame 148 to which the arm controlling motor 102 is pivotally connected. The carriage motor 87 is connected to the carriage 86 by means of a bracket 150 fast to the latter. The carriage motor 87 is adapted to reciprocate the carriage 86 upon a pair of longitudinally spaced apart bearings 152, which slidably receive the carriage supporting rods 82, 84. The vacuum cup framework 98, in addition to including the pairs of pipes 132, 134 and 136, 138, further includes a horizontally extending cross bar 154 which is vertically spaced apart above the horizontally extending base bar 96 of the framework 98. Diagonally disposed reinforcing bars 156 and 158 connect the horizontal base bar 96 and the respective pairs of pipes 132. The bracket 108 connects the pairs of pipes 132, 134 and 136, 138 together as a unit through the pivot connection of the same with the corresponding adjacent one of the break-off arms 92.

By means of the vacuum cups 114, which operate as glass grippers, the vertical rods 128, 130 and a set of cup-connected blocks 160 thus form glass carrying slides which are assembled to and supported by the frame of pipes 132, 134, 136, 138 for longitudinal movement in the previously indicated manner relative to said supporting frame of pipes in that assembly. In the broader perspective, however, it is emphasized that the foregoing assembly of the slide and the frame of pipes 132, 134, 136, 138, which together constitute the glass carrying part of the machine proper, is in turn supported by the slidable carriage 86 through the double pivoted arms 90 and 92. Thus, while the referred-to supporting part 86, i. e., the slidable carriage, imparts necessary translatory motion at times to the actual glass carrying part of the machine, the arms 90, 92 function to enable that glass carrying part to move independently of the supporting carriage part 86 and, in fact, to move when the latter has ceased to move. The swinging motion of the double pivoted sets of arms 90 and 92 is best understood in reference to Figure 3.

In Figure 3, the fixed pivot points for the respective controlling arms 90 and break-off arms 92 are shown at 88 and 94, the same as in Figure 1. In the vertical position of the frame shown at 98a, the controlling arms 90 are substantially horizontally disposed, whereas the break-off arms 92 are inclined diagonally forwardly. Initial retraction of the double acting power cylinder 102 for the arm assembly causes the glass to swing from an initial position 30a into an intermediate position 30b, at or before which the glass break-off and parting of the glass will have occurred. The instant center for the rotation and retraction of the glass from the position 30a to 30b will have progressed from the point of intersection a of the cross arms to a point of intersection b of the cross arms 90, 92. This resulting upward and retractive shift of the instant center of rotation of the glass is the greatest in this period of initial movement per unit of motion of the cylinder than for any of the remainder of the swinging action of the glass framework. A pronounced vertically upwardly extending and horizontally retractive component of the glass insures the most angular displacement and the greatest vertically upward displacement of the glass per unit of motion of the arm controlling motor 102. Accordingly, the glass is cleanly and abruptly snapped off at the scoring line and is progressively moved into the respective positions 30c, 30d about the respective instant centers c and d to a final position 30e in which the glass is horizontal. The framework assumes a corresponding position 98e in which it is likewise horizontal. During advancement movement of the framework 98 from the position 98e to the vertical position 98a, the framework is free from carrying any glass. During break-off and retractive movement, however, from the position 98a to the horizontal position 98e, the framework 98 tenaciously grips and carries a piece of glass 30 by means of the vacuum action of the vacuum cups 114. The construction of the vacuum cups 114 is best understood with reference to Figures 4 and 5.

Figure 4:
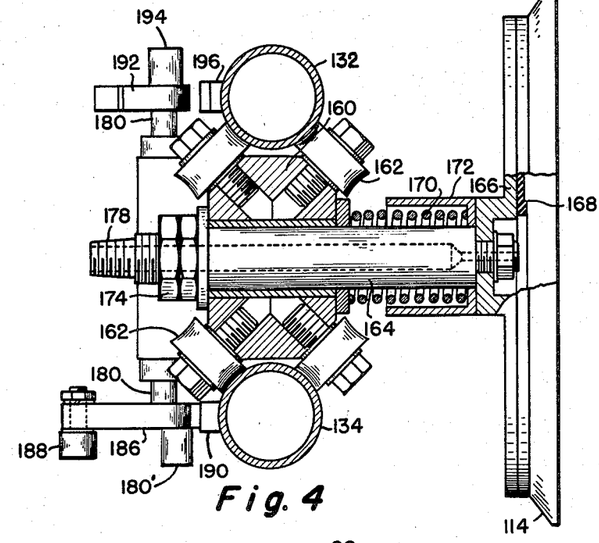
Figure 4 is a sectional view in plan taken along the lines IV—IV of Figure 1.
Figure 5:
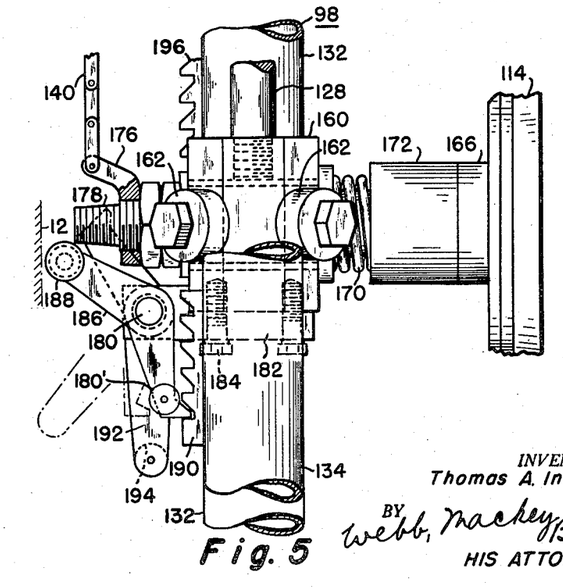
Figure 5 is a side elevational view of the structure of Figure 4.

In Figures 4 and 5, the lowermost vacuum cups 114 are illustrated, these cups being identical to one another on opposite sides of the frame 98 and being essentially typical of the other cups except in the details particularly noted hereinafter. Each of the cups 114 has a carrying block 160 which mounts a group of four stud carried rollers 162, of which two rollers engage one of the parallel pipes 134 and the other two rollers engage the other of the parallel pipes 132 which latter in effect, straddle the block 160. The block 160 threadably receives one end of the vertically extending rod 128 which together with another vertically extending rod 130, Figure 1, connects together the series of three vertically spaced apart vacuum cups 114 provided at each side of the frame 98. The block 160 contains a sleeve bearing which slidably receives a tubular stud 164 which, at its outer forward end, is secured by means of a nut to a vacuum cup backing plate 166. The backing plate 166 carries the cup 114 which is of known frusto-conical construction and which may be of a rubber or neoprene composition at 168. A coil spring 170 surrounds the tubular stud 164 and thrusts at one end against a stationary washer carried by the block 160 and thrusts at the other end against a cup 172 which abuts the vacuum cup backing plate 166. The spring 170 constantly biases the stud 164 and vacuum cup 114 forwardly with respect to the block 160, being limited in its travel by means of a pair of nuts and a washer 174 threadably received at the rear end of the tubular stud 164. The rear end of the stud has a first portion to which the counterbalance chain 140 is connected at 176 and has a second portion 178 for receiving the vacuum conduit 112, Figure 1. Adjacent the bottom rear end of the block 160, horizontally disposed transversely extending pivot rod means 180 is provided which is carried by means of a bracket 182 bolted at 184 to the block 160. At one outer end the pivot rod means 180 carries a one-way acting ratchet member 186 which is weighted with a roller cam 188 at the outer end thereof and having both a counterweight 180' and a pawl at the opposite end of which the pawl is engageable with a toothed rack 190 carried rigidly with the pipe 134. The roller cam 188 of the ratchet 186 is adapted to engage a cam surface portion carried by the bed 12 at any time at which the frame 98 approaches the horizontal position. In the vertical position of the framework 98 as viewed in Figure 5, the ratchet 186 is gravity biased due to the cantilevered position of the roller cam 188 and the adjacent arm of the ratchet 186, of which their combined weight forms the biasing means; this biasing means, therefore, tends to rotate the ratchet 186 counterclockwise so that the pawl portion thereof establishes a one-way connection in the desired way preventing retrograde movement of the vacuum cups in a longitudinal direction with respect to the frame 98 and, accordingly, when the vacuum cups 114 engage a sheet of glass, they can only move upwardly therewith as the sheet of glass moves upwardly but not downwardly. The counterbalance chain 140 substantially neutralizes the weight of the vacuum cups 114 and thus the vacuum cups, in effect, float upwardly with the upwardly driven ribbon of glass leaving the annealing oven. After the glass has broken off from the upwardly moving ribbon and the free weight thereof tends to add additional load to the vacuum cups 114, the pawl 186 is effective to prevent retrograde movement of the broken-off piece of glass which under its own weight would ordinarily tend to interfere with and strike the upwardly moving parent ribbon of glass from which it was separated.

In the horizontal position of the frame 98, at which time the cam portion 188 strikes the bed 12 and causes the ratchet 186 to release, the unloaded vacuum cups 114 are free and move retrogressively longitudinally of the frame 98 as soon as the arm assembly has caused the latter to tilt and commence initial movement toward a vertical position. Somewhere in the intermediate movement of the frame 98 into that vertical position, the pawl at the inner end of the ratchet 186 swings into contact with the rack teeth 190 owing to the natural tendency of the ratchet to seek a neutral satisfied position about the pivot rod 180 at its apex with the opposite ends outstretched and in balance. Toward the final movement of the frame 98 into vertical position, the weight of the outer arm and the roller cam 188 hold the pawl at the inner end of the ratchet 186 in positively urged mesh with the rack teeth 190 to prevent retrograde movement of the grippers 114 in the vertical direction.

At one outer end, the pivot rod means 180 carries another one-way ratchet 192 which is gravity actuated by means of a depending counterweight portion 194 which functions as a biasing means due to its tendency always to remain in the vertical. The ratchet 192 carries a pawl at its upper end which is engageable with a toothed rack 196 mounted rigidly to the frame pipe 132. The pawl on the ratchet 192 is engageable with the rack 196 only when the frame 98 is in horizontal or near horizontal position. It is biased into engagement with the rack by action of the counterweight portion 194 and is likewise released by gravity as soon as the frame 98 approaches a vertical position. The purpose of the ratchet 192 is to prevent continued longitudinally advancing movement of the vacuum cups 114 and the glass carried thereby as the frame 98 approaches a horizontal position in which the counterweight chain 140 is substantially unopposed in its efforts to overbalance the weight of the vacuum cups 114. Accordingly, when and only when the frame 98 approaches horizontal position, the ratchet 192 engages the rack 196 and, in conjunction with the companion ratchet 186, prevents any longitudinal movement of the vacuum cups 114 whatever with respect to the frame 98. In one physically constructed embodiment of the invention, the travel of the vacuum cups 114 was approximately 14 inches longitudinally with respect to the frame 98, the cups thus being available for tracking upwardly with the upwardly moving ribbon of glass for a possible amount of 14 inches.

Figure 6:
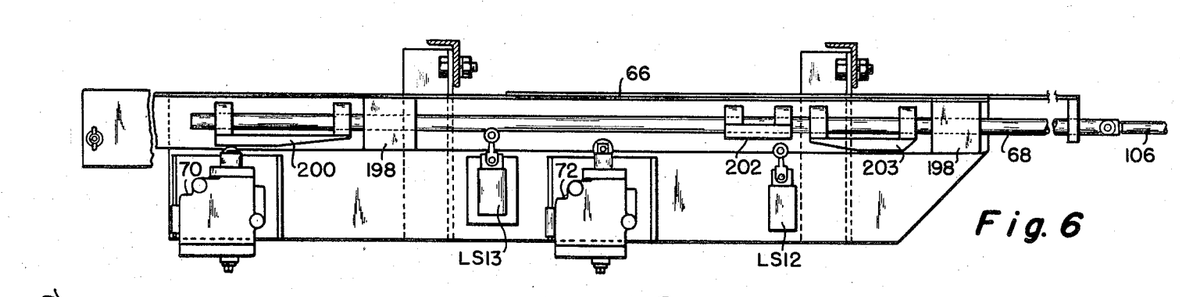
Figure 6 is an enlarged view of the cam shaft device of Figure 1.

In Figure 6, the encased camshaft device 66 and the camshaft 68 and associated structure are shown in detail. The camshaft 68 is connected by means of the link 106 for conjoint movement with the break-off arms 92 of the arm assembly and the vacuum cup framework 98. The longitudinally slidable camshaft 68, suitably supported by means of spaced apart sleeve bearings 198, carries a first cam 200 which operates the plunger actuated valve 70 for restricting speed of upward movement of the arm assembly as it approaches final position. The camshaft 68 carries a second cam 202 which operates the limit switch LS13 so as to release the same when the arm assembly moves upwardly from its horizontal position and so as to depress the same when the arm assembly returns to a position corresponding to the horizontal position of the vacuum cup frame 98. A third cam 203 carried by the camshaft 68 is adapted to engage, on upward movement of the arm assembly, the limit switch LS12 and on downward movement to engage the plunger actuated valve 72 for controlling and restricting arm rate of movement during downward movement of the arm assembly. The cams 200, 202 and 203 are adjustable longitudinally of the camshaft 68 to produce the desired timing of operation of the machine 10 and are motion sensitive to the arm assembly thereof. For a more complete understanding of the operation of the plunger actuated restrictive valves 70 and 72 and the hydraulic system of the machine 10, reference may be had to Figure 7.

Figure 7:
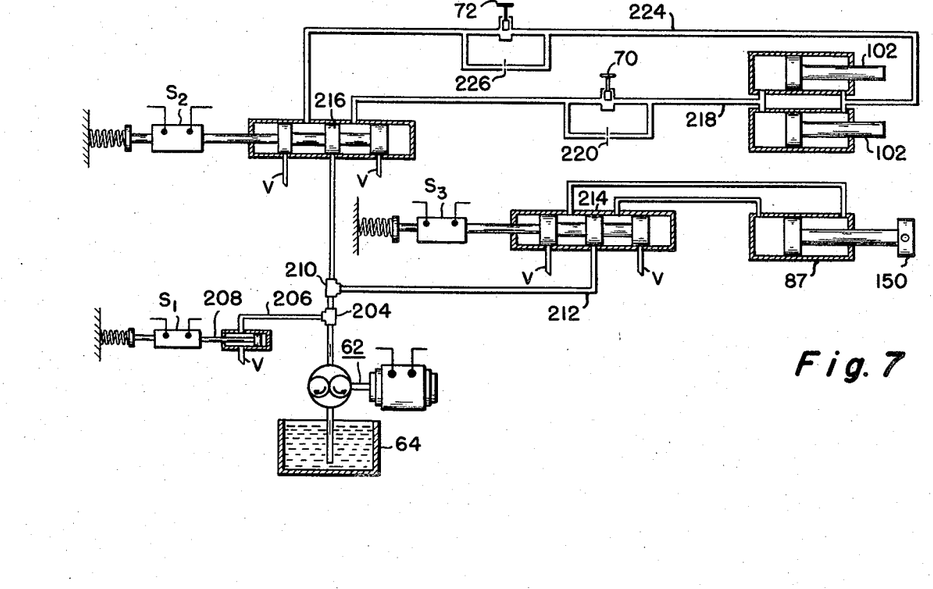
Figure 7 is a piping diagram of the hydraulic system of the machine.

In Figure 7, the pump and hydraulic unit 62 draws hydraulic pressure fluid, which may be oil, from a reservoir tank 64 and discharges it upwardly through a discharge line into a T-fitting 204. One leg of the T 204 is connected to a by-pass 206 controlled by means of a plug valve 208 which is actuatable from a solenoid S1 to plug the normally open by-pass 206. The plug valve 208 is normally urged open to clear the by-pass by means of a spring so as to connect the by-pass to a vent V for free return of oil to the reservoir 64. The other leg of the T-fitting 204 is connected to another T-fitting 210 having one leg which supplies the piston and cylinder type carriage motor 87 with hydraulic fluid through a conduit 212. A three-spool control valve 214 is interposed in the conduit 212 so as to supply fluid alternately to the opposite working ends of the double acting piston and cylinder motor 87. The valve 214 is controlled by means of an electromagnetically energizable solenoid S3 to apply pressure fluid to the rear end of the carriage motor 87 to advance the carriage through its connection at 150 with a bracket carried by the carriage. When the solenoid S3 is deenergized, a return spring restores the valve 214 to the oposite rightward position wherein it connects the rear end of the motor 87 to the vent and applies pressure fluid to the forward end thereof to retract the carriage. Another leg of the T-fitting 210 is connected to a three-spool control valve 216 which controls the respective motors 102 for operating the arm assembly. The control valve 216 is connected to the rear of the arm controlling motors 102 through a conduit 218 which is effective when pressurized to extend the arm assembly. The conduit 218 includes a portion restricted by an orifice 220 and a by-pass portion which includes the plunger actuated restrictive valve 70 controlled by the camshaft 68. Depression of the plunger actuated valve 70 causes the by-pass to close, thus diverting the entire flow of oil in the conduit 218 through the restrictive orifice 220 so as to slow the forward motion of the arm controlling motors 102 toward the latter part of their forward travel. An arm retracting conduit 224 acts as the return line to drain the arm controlling motors 102 during their forward movement and, alternativley, acts as the pressure line for being pressurized and forcibly retracting the motors 102. The conduit 224 includes an orifice 226 having the plunger actuated restrictive valve 72 connected in a by-pass line in parallelism therewith. Depression of the plunger actuated valve 72 by means of the cam 203 on the camshaft 68 causes the entire flow of pressure fluid in the conduit 224 to be diverted through the restrictive orifice 226 and thus slow down the retractive movement of the arms toward the latter phase thereof.

Selective advancement and retraction of the arm assembly is effected through the control valve 216 which is controlled by a solenoid $S_2$. Energization of the solenoid $S_2$ causes the valve 216 to be shifted to the left and the arm controlling motors 102 to advance the arm assembly. Deenergization of the solenoid $S_2$ is accompanied by an expanding motion of a return spring connected thereto which shifts the control valve 216 to the right so as to cause the double acting piston and cylinder motors 102 to retract the arms. The effect of energization of the solenoids $S_1$, $S_2$, and $S_3$ in their relationship with the balance of the control system is best understood with reference to Figure 8.

Figure 8:
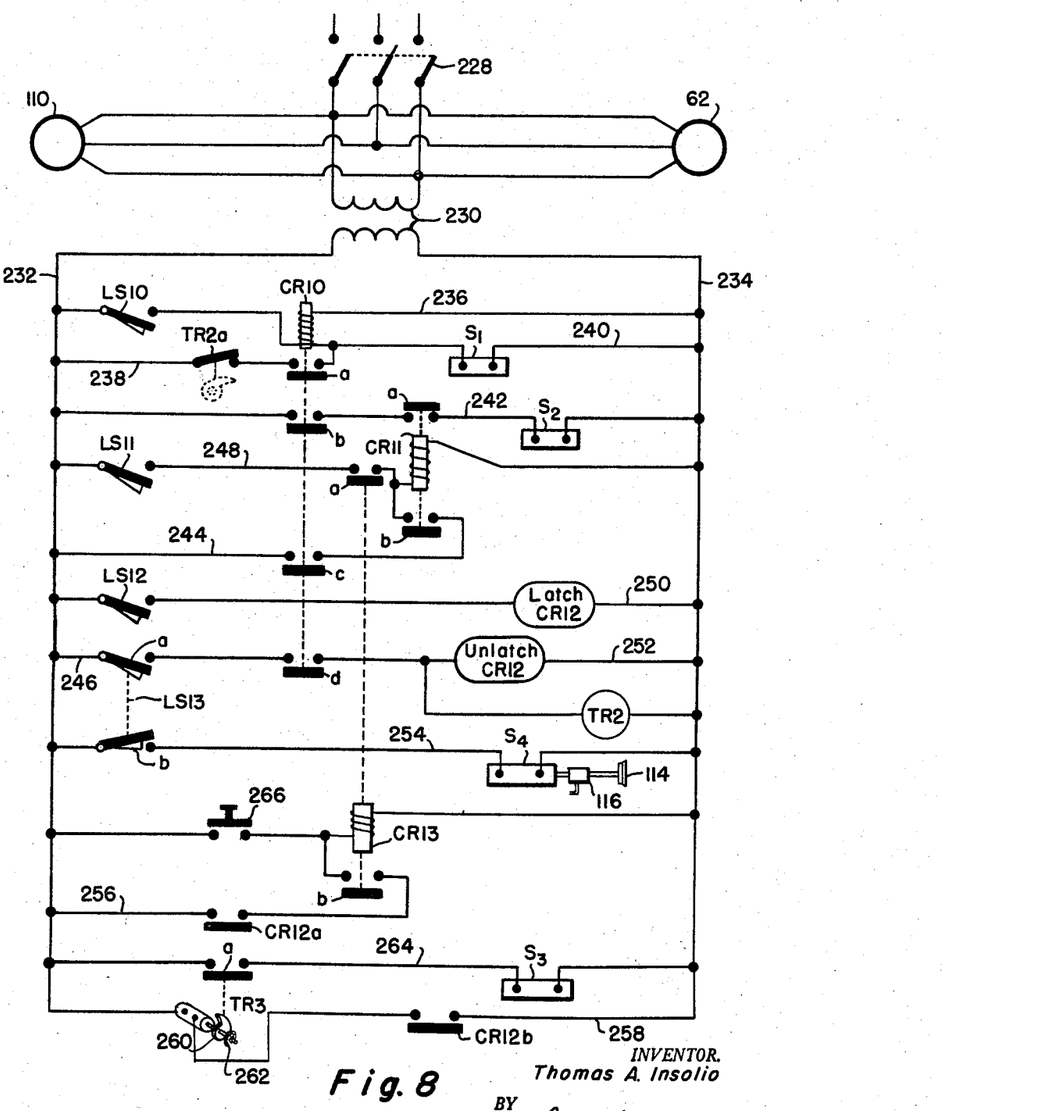
Figure 8 is a schematic wiring diagram of the electrical system of the machine.

In Figure 8, a three-pole single throw switch 228 is used to connect the electrically driven vacuum pump 110 and the electrically driven pump and hydraulic unit 62 to a source of three-phase electric power. A single phase transformer 230 is connected between two of the phases to supply a single-phase circuit including a pair of supply and return current conductors 232 and 234. A control relay CR10 is connected in a first circuit 236 connected between the conductors 232 and 234 which includes the limit switch LS10 actuated by the cam 36, Figure 1. The relay CR10 has a holding circuit 238 including a set of contacts TR2a controlled by an electrically driven timing relay TR2 and also an upper set of contacts a controlled by the relay CR10 to provide its own holding circuit. Connected in parallel with the relay CR10, there is a conductor 240 which includes the plug valve solenoid $S_1$ for operating the plug valve 208, Figure 7. The relay CR10 includes additional sets of contacts operated thereby, comprising a set of contacts b included in a circuit 242, a set of contacts c included in a holding circuit 244 for a control relay CR11, and a lowermost set of contacts d included in a circuit 246 which includes the upper set of contacts a of a limit switch LS13. The just-mentioned circuit 242 includes the solenoid $S_2$ for controlling the arm assembly controlling valve 216, Figure 7, and also an upper set of contacts a controlled by the control relay CR11. The control relay CR11 is initially energized through a conductor 248 which includes therein the limit switch LS11 operated by the cam 36, Figure 1. The conductor 248 further includes an upper set of contacts a controlled by a control relay CR13. Energization of the conductor 248 momentarily, due to the closing of the limit switch LS11, causes the control relay CR11 to be energized to hold itself in circuit through its holding contacts b included in circuit with the conductor 244 and also to open-circuit the conductor 242 in which the upper contacts a of the control relay CR11 are interposed. A pair of circuits 250, 252 which include respective latching and unlatching sections for the same latching type control relay CR12 are respectively energized through a limit switch LS12 operated by the cam 203, Figure 6, and by the conductor 246 which includes the upper contacts $a$ of the limit switch LS13. Energization through the conductor 246 simultaneously energizes the timing relay TR2 previously mentioned which is connected in parallel with the unlatching section for the latching type control relay CR12. A set of bottom contacts $b$ for the limit switch LS13 is included in a circuit 254 which further includes a solenoid $S_4$ for use in operating the vacuum cup valve 116. Energization of the solenoid $S_4$ causes the vacuum cups 114 to be connected to the vacuum source 110, Figure 1, and deenergization of the solenoid causes the vacuum cups 114 to be connected to atmosphere. The relay CR13, in addition to including the upper contacts $a$ thereof previously mentioned, also includes a lower set of contacts $b$ which are arranged in a self-holding circuit 256 for the relay CR13. The holding circuit 256 includes a set of normally open contacts CR12$a$ controlled by the latching relay CR12. A further set of latching relay contacts CR12$b$ is included in a circuit 258 which selectively energizes and deenergizes a timing relay TR3 having a motor driven cam 260. Energization of the relay TR3 causes the cam 260 to rotate in a clockwise operative direction and deenergization permits the cam 260, under the action of a clock spring 262, to rotate counterclockwise into an inoperative position. Rotation of the cam 260 into an operative position causes the closing of a set of contacts $a$ in the relay TR3 which are included in a circuit 264 containing the solenoid $S_3$ which positions the carriage control valve 214. The resulting energization of the solenoid $S_3$ causes the carriage valve to direct fluid for moving the carriage forwardly, whereas deenergization of the solenoid $S_3$ causes the carriage to retract. For convenience and uniformity, the circuit relay TR2 may employ similar or identical mechanism as the relay TR3 for opening and closing the contacts of the former at TR2$a$. A starting switch 266 is included in circuit with the relay CR13 in parallel to the relay holding circuit 256.

In the operation of the wiring diagram of Figure 8, let it be initially assumed that the relays CR10, CR11, CR12, and CR13 are deenergized and that the timing relays TR2 and TR3 are deenergized with appropriate switches in their circuits being opened, where necessary, to cause the solenoids $S_1$, $S_2$, $S_3$, and $S_4$ to be deenergized. The starting switch 266 may be manually actuated to start a cycle of the electrical system, but preferably it is operated by means of a set of contacts similar to the contacts 163 operated by a relay CR6 in the Klages Patent No. 2,650,430 or, in the alternative, is operated by a limit switch control after the manner of the limit switch LS4 in the patent just referred to. In either of the latter two cases, the switch 266 in the present Figure 8 will be closed substantially as soon as the cutter's cage 38, has traveled in its supporting carriage to make a complete score in a sheet of glass. Closing of the switch 266 energizes the relay CR13 and continues to hold the relay energized until the switch 266 is subsequently opened. The limit switch LS10, closed by the cam 36, Figure 1, completes the circuits 236 and 240 so as to energize the relay CR10 and close the contacts $a$, $b$, $c$, and $d$ thereof and also energizes the plug valve solenoid $S_1$ to plug up the by-pass 206, Figure 7, from the pump unit 62 so as to apply full line pressure to the hydraulic system. Simultaneously with the energization of the relay CR10, the self-holding contacts $a$ thereof close to hold the relay and the solenoid $S_1$ in a circuit, regardless of subsequent opening of the limit switch LS10. The relay contacts $b$ for the control relay CR10 energize the conductor 242 so as to operate the solenoid $S_2$ which causes the arm controlling motors 102 to advance the arm assembly on the machine and set the framework 98 in vertical position. The contacts $c$ of the relay CR10 close to prepare the holding circuit 244 for the control relay CR11, and the lowermost contacts $d$ of the relay CR10 close to complete the unlatching section circuit 252 for the control relay CR12 so as to release the latter and prepare the latching relay CR10 for subsequent operation. Additionally, the time delay relay TR2 is temporarily energized by means of the contacts $d$ of the relay CR10. The resulting advancing motion of the arm assembly carries with it the camshaft 68 and the cam 202 carried thereby which ordinarily holds the limit switch LS13 in the position shown in solid lines in Figure 8. Advancement of the cam 202 permits the limit switch LS13 to open the upper contacts $a$ thereof and complete the circuit 254 which includes the lower contacts $b$ thereof. Accordingly, the temporarily energized time delay relay TR2 is deenergized before it has become effective, the unlatching section of the latching type relay CR12 is deenergized, and the solenoid $S_4$ is energized so as to communicatively connect the vacuum cups 114 to the vacuum pump 110.

Further advancement of the arm assembly and the camshaft 68 causes the cam 203, Figure 6, to engage the limit switch LS12 which energizes the circuit 250, including the latching section of the latching type relay CR12. The latching type relay CR12 closes the contacts CR12$a$ and CR12$b$ to close the holding circuit for the relay CR13 for holding itself in circuit, regardless of subsequent opening of the switch 266 and for energizing the time delay relay TR3 in the circuit 258. After a momentary time delay, the time delay relay TR3 closes its upper set of contacts $a$ to energize the circuit 264, including the solenoid $S_3$ for the carriage motor.

The solenoid $S_3$ causes the control valve 214, Figure 7, to shift to the left so as to extend the piston and cylinder type carriage motor 87 and advance the carriage and the erected arm assembly and vertical frame forwardly. In this position, with the arms advanced, with the carriage forward, and with the vacuum cup frame 98 disposed vertically, the machine 10 is prepared for break-off operation instituted by the limit switch LS11.

After the rising sheet of glass has moved upwardly to a point at which the cam 36, Figure 1, actuates the limit switch LS11 to close the same, the circuit 248 is completed through the control relay CR11 which closes its holding circuit 244 by means of its lower contacts $b$ and which open-circuits the circuit 242, including the solenoid $S_2$ for the arm controlling motor. Deenergization of the arm controlling solenoid $S_2$ causes the arm controlling motors 102 to begin retrograde action under action of hydraulic pressure fluid in the conduit 224, Figure 7. Retractive movement of the arm assembly proceeds under these circumstances with the glass gripped by the vacuum cups 114 and tending to break open along a clean horizontal break line. After break-off, when the piece of rectangular glass approaches a position of between five and six degrees from the horizontal, the cam 202, Figure 6, for the limit switch LS13 actuates the limit switch to open the lower contacts $b$ thereof and close the normally closed contacts $a$. The just-noted contacts $b$ open-circuit the conductor 254 so as to deenergize the solenoid $S_4$ and permit the valve 116 to reconnect the vacuum cups 114 to atmosphere. Closing of the just-noted upper contacts $a$ of the limit switch LS13 energizes the time delay relay TR2 and simultaneously energizes the unlatching section for the relay CR12 so as to open the contacts of the latter. Opening of the relay contacts CR12$a$ deenergizes the control relay CR13 which open-circuits the conductor 248 connected to the control relay CR11, and opening of the relay contacts CR12$b$ deenergizes the time delay relay TR3 permitting the spring 262 thereof to open the contacts $a$ and deenergize the solenoid $S_3$. The solenoid $S_3$ thereby permits the carriage motor valve and carriage motor 87 to be restored to their normal retracted positions so as to retract the carriage from the arm assembly.

A few moments after energization of the time delay relay TR2, the normally closed contacts TR2$a$ thereof are opened to open-circuit the solenoid $S_1$ and the control relay CR10. The solenoid $S_1$ permits the by-pass 206, Figure 7, to by-pass the hydraulic unit 62 at substantially no load and the deenergization of the relay CR10 causes the holding circuit contacts $a$ to open and likewise the contacts $b$ to completely disable the circuit 242 not presently energized. The contacts $c$ of the relay CR10, when open, deenergize the relay CR11, which thereupon releases its own holding contacts $b$. The lowermost contacts $d$ of the relay CR10 open-circuit the unlatching section 252 for the latch relay CR12 and also deenergize the time delay relay TR2 which permits its contacts TR2$a$ to be restored to normally closed position. Thus, the conditions assumed at the outset are restored, namely, that the relays CR10, CR11, CR12, and CR13 are deenergized, the time delay relays TR2 and TR3 are deenergized, and finally, the control valve solenoids $S_1$, $S_2$, $S_3$, and $S_4$ are deenergized.

In brief, the overall operation of the device of Figures 1 through 8 includes, in sequence, a first step of closing the switch 266, Figure 8, either manually or automatically, to prepare the glass break-off machine for operation from its horizontal retracted position. Actuation of the limit switch LS10, Figure 1, due to upward travel of the glass and the cutter's cage 38 causes the arm assembly to advance and causes the carriage 86 to advance to a position at which the vacuum cups 114 engage the glass sheet 30. Subsequent travel of the glass sheet 30 which carries the cups upwardly therewith causes the limit switch LS11 to be actuated as the cutter's cage 38 continues to rise. Thereupon, the vacuum cup frame 98 is rotated and retracted by means of the arm assembly rearwardly so as to snap off the glass sheet along a line formed by the scoring tool 40. The vacuum cups 114 yieldably suspended by springs 170, Figure 4, carry the separated glass sheet to a position substantially five or six degrees from the horizontal, at which time the glass is just above the casters 48, Figure 1. The vacuum in the cups is broken, the glass is gently transferred to the casters 48, and the arms continue to fully retract to a position at which the frame 98 is below the level of the casters 48. Simultaneously, the carriage 86, free of any glass load, is retracted rearwardly to its retracted position. The operator of the machine 10 then manually removes the section of broken off glass from the casters 48 and the machine 10 is ready for another cycle of being advanced into gripping engagement with a scored sheet of glass.

From the foregoing, it will be appreciated that a novel glass break-off machine 10 has been disclosed, having the feature of portability offered by the casters 26 for supporting the bed 12 thereof. This feature of portability is decidedly in contrast to overhead rail supported systems and other stationary apparatus for handling glass which are useful only in a fixed location in conjunction with one particular glass machine. It is manifest that the automatic operation of the present machine 10 is greatly to be desired and that, even though high speed arm advancing motion and high speed retractive snap-off motion is employed, the arms are limited as they approach each extreme of motion by reason of their speed restricting control valves 70 and 72, Figure 6. It will be further appreciated that the abrupt break-off action of the machine 10 for producing a clean parting line between the sections of parted glass is accounted for to a large extent by the greatly advantageous abrupt break-off action of initial upward vertical motion, plus rapid angular displacement taking place about a rising and retracting instant center, Figure 3, the distance between successive instant centers of which gradually decreases following the initial break-off action.

Variations within the spirit and scope of the invention described are equally comprehended by the foregoing description.

I claim:

1. Apparatus for detaching and removing a sheet of flat glass from an upwardly traveling ribbon of glass provided with a line of severance transversely thereof, comprising a carriage shiftable toward and from the ribbon, a normally vertically disposed gripper frame, arms swingably mounting the frame to the carriage for break-off movement toward a horizontal position, glass grippers for engaging the glass sheet, means slidably mounting the grippers for synchronized longitudinal movement with the glass relative to the gripper frame, first one-way holding means effective when the frame is vertical to prevent retrograde longitudinal movement of the gripper mounting means relative thereto, and second one-way holding means effective when the frame approaches horizontal to prevent advancement of the gripper mounting means in a longitudinal direction.

2. Apparatus for detaching and removing a sheet of flat glass from an upwardly traveling ribbon of glass scored transversely thereof, comprising a normally vertical gripper frame, arms swingably mounting the frame relatively to the apparatus for break-off movement to a horizontal position, glass grippers engaging the glass sheet, means slidably mounting the grippers for synchronized longitudinal movement with the glass relative to the gripper frame, means effective when the frame is vertical to prevent retrograde longitudinal movement of the gripper mounting means relative thereto, and means actuated by gravity when the frame approaches the horizontal to prevent advancement of the gripper mounting means in a longitudinal direction.

3. In apparatus for detaching and removing a sheet of flat glass from an upwardly traveling ribbon of glass having a transverse scored line thereacross, the combination of a carriage shiftable toward and away from the ribbon, a gripper frame, crossed arms pivoted to and swingably mounting the gripper frame to the carriage for movement between an extreme vertical position and at least one other extreme position, power means, said arms being arranged to be actuated by the power means into a retracted position so as to rock the gripper frame from the vertical position of said other extreme position about an upwardly and outwardly shifting center substantially level with the score line, glass grippers for engaging the glass sheet, and means slidably mounting the grippers for longitudinal movement relative to the gripper frame and including gravity-operated, disengageable connections between the grippers and the frame preventing unwanted movement of the grippers in one direction relative to the frame in each of the two extreme positions thereof stated.

4. Portable break-off apparatus comprising a wheel carrying bed, a carriage slidably mounted to the bed for horizontal motion, an assembly mounted to the carriage including a gripper frame and crossed arms pivoted to the carriage and swingably supporting the gripper frame from the carriage at their free ends, means for swinging said frame into a vertical position, means to retard movement of said frame as it approaches the vertical position, means for automatically advancing said carriage and assembly when said frame is vertical to a position adjacent a scored piece of glass, and grippers shiftably carried by the gripper frame for engagement with the piece of glass.

5. Portable break-off apparatus comprising a wheel carrying bed, a carriage slidably mounted to the bed for horizontal motion, an assembly mounted to the carriage including a gripper frame and crossed arms, said crossed arms being pivoted to the carriage and swingably supporting the gripper frame at their free ends, pressure fluid means for swinging said arms to move the frame into a vertical position, valve means responsive to movement of said assembly to restrict said pressure fluid means and limit the speed of movement of said frame as it approaches vertical position, means for automatically advancing said carriage and assembly when said frame is vertical to a position adjacent a scored piece of glass, and grippers shiftably carried by the gripper frame for engagement with the piece of glass.

6. A portable break-off machine including a carriage slidably mounted thereto for horizontal motion, an assembly mounted to the carriage including a gripper frame and crossed arms pivoted to the carriage and swingably supporting the gripper frame at their free ends, pressure fluid means for swinging said arms to move the frame between substantially horizontal and vertical limiting positions, valve controlled conduit means responsive to movement of said frame toward the respective limiting positions to restrict the fluid flow in the pressure fluid means and retard the final movement of said frame, means for advancing the carriage and assembly toward and from a position adjacent to a sheet of scored glass, and grippers shiftably carried by the gripper frame to engage the glass.

7. A portable break-off apparatus comprising a bed, a carriage slidably mounted to the bed, an assembly mounted to the carriage including a gripper frame and crossed arms, said crossed arms being pivoted to the carriage and swingably supporting the gripper frame from the carriage at their free ends, pressure fluid means for swinging said arms to move the frame between substantially horizontal and vertical limiting positions, valve controlled conduit means responsive to movement of said frame toward the vertical position to restrict the fluid flow in the pressure fluid means and retard the final movement of said frame, means for sliding the carriage and assembly when said frame is vertically disposed toward a position adjacent to a sheet of scored glass, and grippers shiftably carried by the gripper frame to engage the glass.

8. In portable apparatus for breaking off a sheet of scored glass from an upwardly moving glass ribbon and having a bed supported on wheels, the combination of a carriage having means for slidably mounting the same to the bed for relative fore and aft movement, an assembly mounted to the carriage including a frame and crossed arms pivoted to the carriage and swingably supporting the frame at their free ends, fluid power means having restrictable conduits to apply a fluid pressure differential thereto for swinging said arms under power to move the frame between limiting operating positions, an actuating member to control the effective restriction in said conduits for the fluid power means and having an operative connection to the arms so as to retard movement of the fluid power means and limit the speed of the frame as it approaches each limiting position, and vacuum cups slidably carried by the frame for gripping the sheet of glass to break off same.

9. In portable apparatus for breaking off a sheet of scored glass from an upwardly moving glass ribbon and having a bed supported on wheels, the combination of a carriage having means for slidably mounting the same to the bed for relative fore and aft movement, an assembly mounted to the carriage including a frame and swinging arms pivoted to the carriage and swingably supporting the frame at their free ends, hydraulic means having restrictable conduits to conduct the hydraulic fluid thereto and drivingly connected for swinging said arms to move the frame between limiting operating positions, a camshaft providing an operative connection between a point on the arms and means in the restrictable conduits to control the effective restrictive effect thereof so as to retard movement of the hydraulic means and limit the speed of the frame as it approaches each limiting position, vacuum cups slidably related to the frame for gripping the moving sheet of glass, and hydraulic means for sliding the carriage and the assembly mounted thereto toward and from the sheet of glass.

10. In portable apparatus for breaking off a sheet of scored glass from an upwardly moving glass ribbon, the combination of a carriage, an assembly mounted to the carriage including a frame and swinging arms pivoted to the carriage and swingably supporting the frame at their free ends, a double acting hydraulic cylinder with restrictable supply conduits to drive the same and connected to move the frame between limiting operating positions, cams connected to the arms and engageable with restrictive valving in the conduits for restricting the same to retard movement of the hydraulic cylinder and limit the speed of the frame as it approaches each limiting position, and suction cups shiftably carried by the frame for gripping the sheet of glass.

11. Apparatus of the character described including a gripper frame mounted to swing to limiting positions between the plane of a horizontal bed and a vertical reference plane defined by a sheet of glass, a support, a set of glass grippers slidably related to the frame by means of said support and having ratchet device means actuable to provide ratchet connections between the support and said frame, said ratchet device means having activating means therefor comprising a gravity weight operatively connected thereto for activating one of said ratchet connections so as to produce a reverse-motion-preventing connection enabling said support with the set of grippers to ratchet only upwardly with the glass with respect to the frame, and a second gravity weight connected to activate the other of said ratchet connections to produce a one-way stop connection between the support and said frame so that said support with the set of grippers ratchets in one lateral direction only on the frame with respect to the horizontal bed.

12. Apparatus according to claim 11 including cam-engaging means on said horizintal bed, and wherein the first named gravity weight comprises a cam portion engageable with the last-said means on the horizontal bed to automatically release said one reverse-motion-preventing connection.

13. A glass break-off machine comprising a bed, a carriage slidably mounted to the bed for horizontal movement, a glass gripper frame swingably mounted to the carriage for movement from a horizontal position to a substantially vertical position adjacent a sheet of glass, power cylinder means drivingly connected to slide the carriage with respect to the bed, and means responsive to initial swinging movement of the glass gripper frame from the horizontal position in the direction of the vertical position for operating the power cylinder means so as to slide the carriage with the frame thereon toward the sheet of glass.

14. Portable structure for breaking off glass comprising in combination a glass carrying supported part, a supporting part therefor, means forming an operative connection between the parts comprising first drive means effective to move said supported part through a curved path from and into a horizontal position from another extreme position of travel at least approximately vertical, second drive means on said structure having a time delay control for operating same in timed coordination to the first drive means said second drive means connected between said structure and said supporting part and effective at a separate time to shift said supporting part and said supported part longitudinally of said structure when said supported part reaches one of the extreme positions aforesaid, and glass grippers supported by and mounted for longitudinal movement relative to the supported part.

15. Structure according to claim 14 wherein said supported part is arranged to take a vertical attitude with the glass at said other extreme of travel, and wherein said second means comprises a reversible motor with controls effective incident to said supported part taking a vertical attitude to subsequently shift said supporting part in one direction longitudinally and effective incident to said supported part taking a horizontal attitude to subsequently shift said supporting part in a reverse direction.

16. Structure of the character described for breaking off glass comprising a glass carrying gripper slide, a supporting framework therefor in parallel relation and within which the slide is assembled in slidable relation, means to move said assembly through a fixed curve path above said structure and having extremes of travel in which said assembly takes horizontal and vertical positions, a one-way connection between said slide and said framework comprising a pawl on one engageable with means on the other to prevent relative motion therebetween in one direction only, said one-way connection having gravity weight operated means controlling the same to effect said engagement between the slide and framework in said assembly upon taking one of said horizontal or vertical positions, and glass grippers supported by and mounted for longitudinal movement with said slide relative to said supporting frame.

17. Structure according to claim 16 wherein said gravity weight operated means has an arm connected with said pawl, said arm providing a gravity weight arranged on said arm for swinging said arm and urging it to bias said pawl into and out of the engagement aforesaid due to the tendency of said arm to seek the position in which it is urged by said gravity weight throughout the various attitudes of movement of said assembly.

18. Structure according to claim 16 wherein said gravity weight operated means includes a gravity weight connected to operate said pawl into engaged position when said assembly occupies a vertical attitude and having a cam portion engageable with means on said structure to automatically release said pawl when said assembly occupies a horizontal attitude.

19. An apparatus for detaching and removing a sheet of flat glass from an upwardly traveling, transversely scored ribbon of glass, comprising a plurality of vacuum cup means to grip the glass sheet, a normally vertical vacuum cup framework, and means for moving said framework through a curved path comprising arms operatively connected to a bed of the apparatus and to said framework for break-off movement to a longitudinally displaced horizontal position, and characterized by a slide slidably mounting the vacuum cup means for independent relative movement in opposite longitudinal directions with respect to said framework, first and second means positionable to stop said slide from longitudinal displacement on said framework, and biasing means to pivot said first means into a slide stopping position for preventing retrograde movement thereof in the longitudinal direction when said framework is substantially vertical and said second means into slide stopping position also preventing relative movement thereof in one longitudinal direction when said framework is substantially horizontal.

20. Apparatus of the character described including a gripper frame mounted to swing to limiting positions between the plane of a horizontal bed and a vertical reference plane defined by a sheet of glass, a support, a set of glass grippers slidably related to the frame by means of said support, pivot rod means on said support, said support having dual ratchet mechanism coaxially mounted to said pivot rod means thereon and actuatable to provide different operative connections between said support and said frame dependent on the position of swing of said frame, said dual ratchet mechanism having activating means comprising a gravity weight which is operatively connected thereto and which in one of said frame positions is effective to establish one of said connections so that said support and said set of grippers ratchets in one longitudinal direction only with the glass with respect to the frame, and a second gravity weight connected to establish another of said connections when said frame is in a different position so that said set of grippers ratchets in the opposite longitudinal direction only with respect to the frame.

21. Structure of the character described for breaking off glass comprising in combination a glass carrying supported part, a supporting part thereof provided with sets of double pivoted arms forming an operating linkage between the parts to move the supported one through a curved path of movement relative to said supporting part, each arm being relatively rigid between its end portions with the arms of each set mounted at one end portion to pivot on an axis fixed in said supporting part so as to be longitudinally spaced from the rotational axis of the other set of said arms, each set of said arms being connected at the opposite end portion to pivot on an axis fixed to said supported part in a manner to remain non-parallel to the other set of said arms in all positions, and glass grippers supported by and mounted for longitudinal movement relative to the supported part.

22. Structure according to claim 21 and further comprising motor means pivotally connected directly at one end to one of said supporting and supported parts and at the other end to the other of said parts to produce said relative movement.

References Cited in the file of this patent

UNITED STATES PATENTS

| | | |
|---|---|---|
| 851,709 | Thompson | Apr. 30, 1907 |
| 1,412,109 | Evans | Apr. 11, 1922 |
| 1,996,387 | Owen | Apr. 2, 1935 |
| 2,026,781 | Geer | Jan. 7, 1936 |
| 2,091,673 | Orlow | Aug. 31, 1937 |
| 2,111,393 | Gaskell | Mar. 15, 1938 |
| 2,628,453 | Pye | Feb. 17, 1953 |